United States Patent [19]

Fioravanti et al.

[11] Patent Number: 6,078,458

[45] Date of Patent: Jun. 20, 2000

[54] SERVO TRACK WRITING USING ADAPTIVE ROTATIONAL SPEED CONTROL

[75] Inventors: Louis J. Fioravanti, Edmond; Bobby E. Conley, Yukon; Russel R. Clemmons, Choctaw; T. L. Parasuram, Oklahoma City, all of Okla.

[73] Assignee: Seagate Technology, Inc., Scotts Valley, Calif.

[21] Appl. No.: 08/926,377

[22] Filed: Sep. 9, 1997

Related U.S. Application Data

[60] Provisional application No. 60/036,127, Jan. 21, 1997.

[51] Int. Cl.$^7$ ..................................................... G11B 15/46
[52] U.S. Cl. .......................................... 360/73.03; 360/69
[58] Field of Search ........................... 360/69, 71, 73.01, 360/73.03, 75, 55

[56] References Cited

U.S. PATENT DOCUMENTS

| | | |
|---|---|---|
| 5,164,863 | 11/1992 | Janz . |
| 5,241,430 | 8/1993 | Janz . |
| 5,262,907 | 11/1993 | Duffy et al. . |
| 5,631,999 | 5/1997 | Dinsmore . |
| 5,892,635 | 4/1999 | Morita ................................... 360/77.02 |

*Primary Examiner*—Andrew L. Sniezek
*Attorney, Agent, or Firm*—Crowe & Dunlevy

[57] ABSTRACT

Apparatus and method for writing servo information in a head disc assembly (HDA) comprising a head, a disc and a spindle motor for rotating the disc. The servo information is written by the head to servo fields on the disc. A positioning system positions the head relative to the disc and a control circuit controls the positioning of the positioning system as well as the rotational speed of the spindle motor. An electro-mechanical transducer outputs a signal indicative of vibratory response of the HDA as the disc is rotated and a computer is provided which instructs the control circuit to rotate the spindle motor at each of a plurality of rotational speeds while characterizing the vibratory response of the HDA using the signal from the transducer for each of the rotational speeds. An optimal rotational speed is thereafter selected and used to write the servo information, the optimal rotational speed minimizing variation in the placement of the servo information.

12 Claims, 4 Drawing Sheets

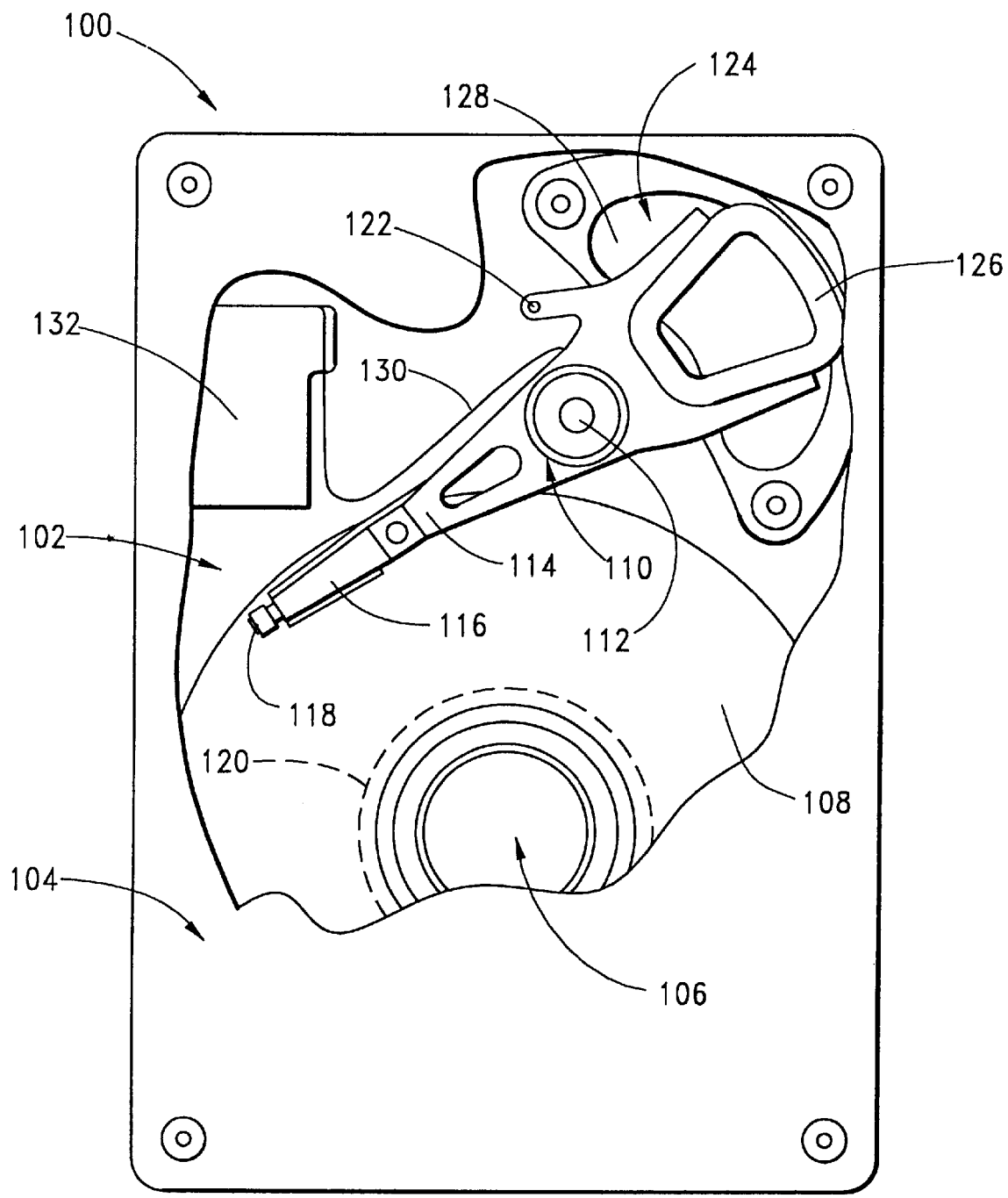
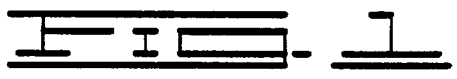

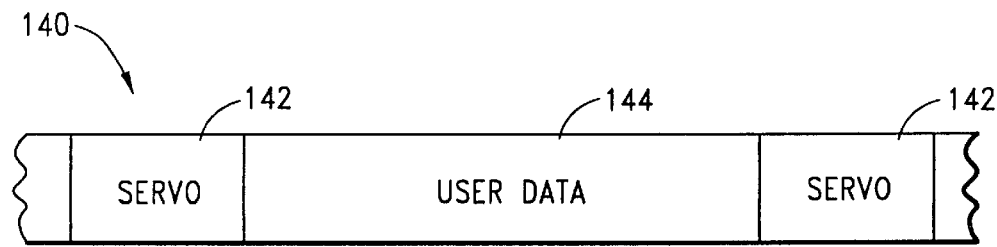
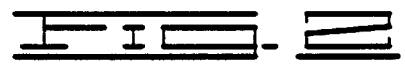
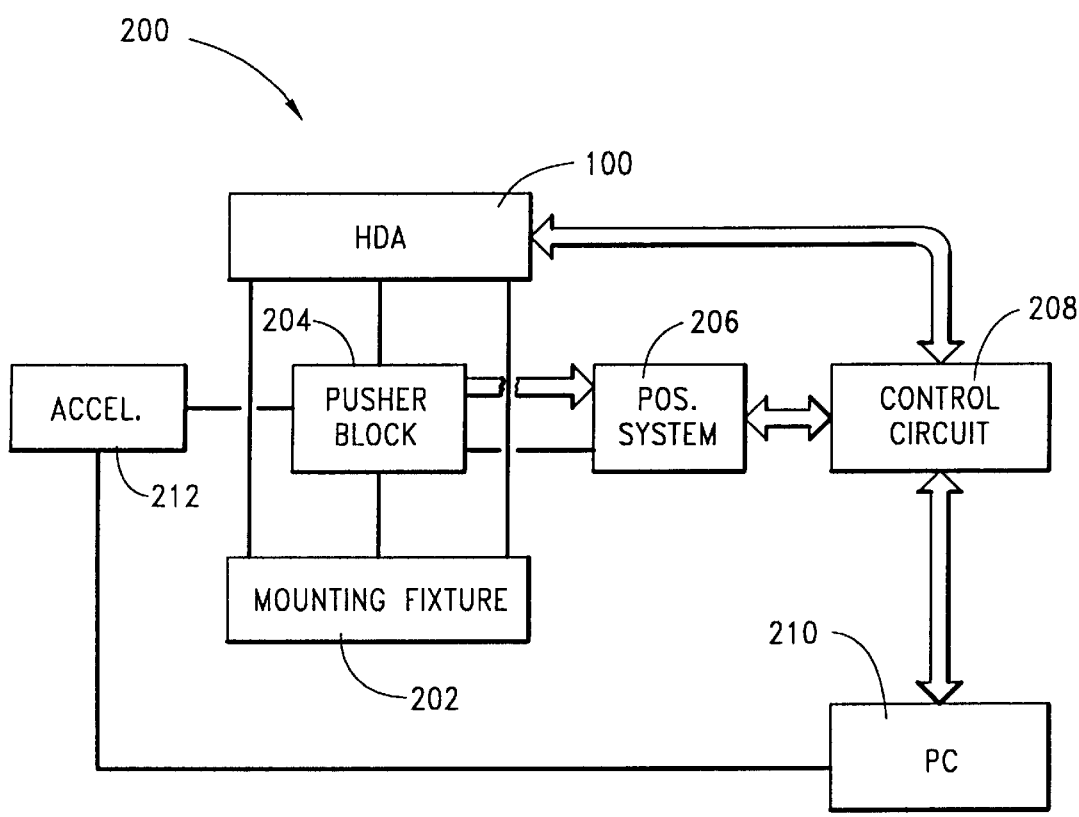

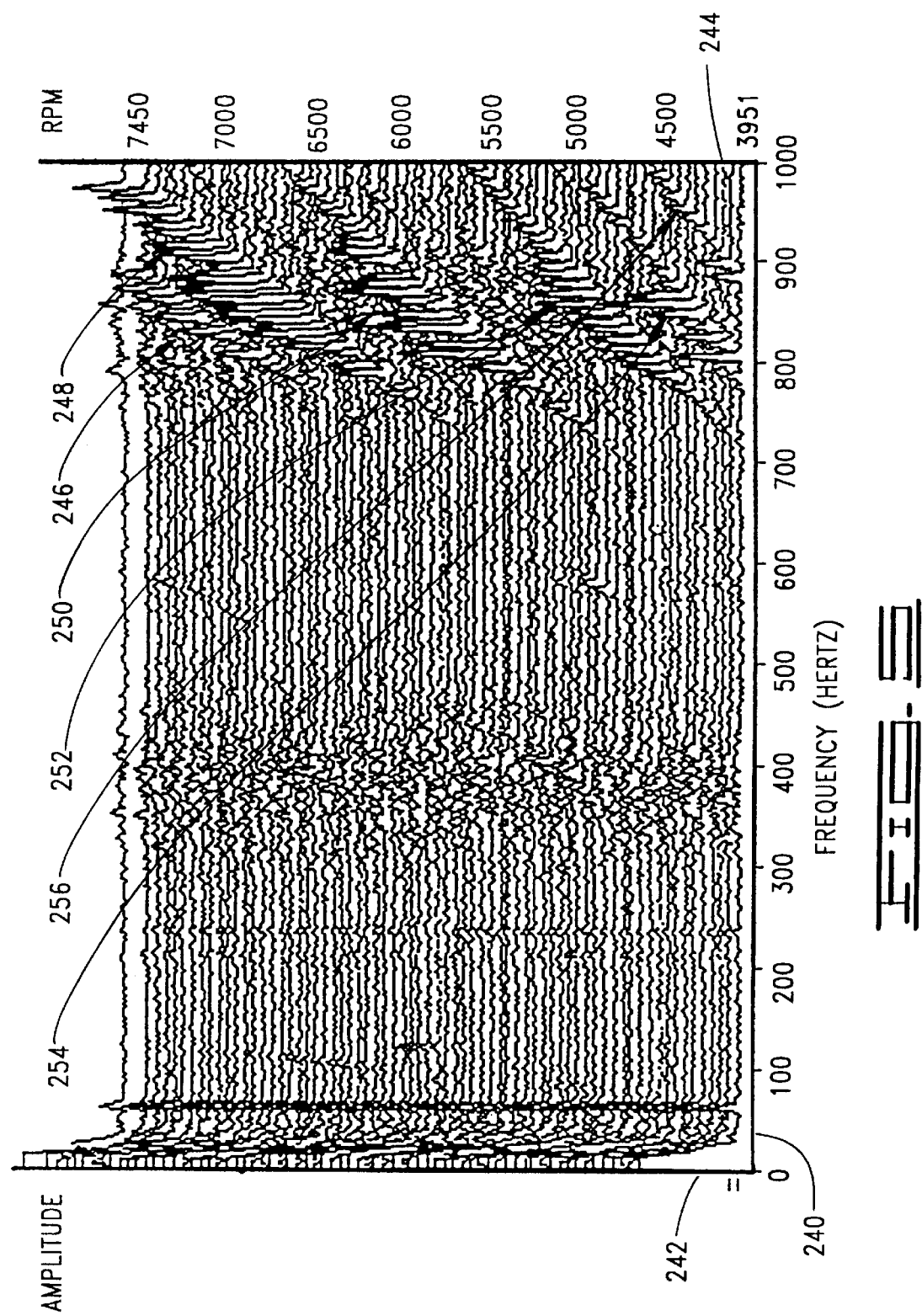

SERVO TRACK WRITING USING ADAPTIVE ROTATIONAL SPEED CONTROL

RELATED APPLICATIONS

This application claims priority to U.S. Provisional Application No. 60/036,127 entitled Adaptive Write Speed For Servo Track Writer, filed Jan. 21, 1997.

FIELD OF THE INVENTION

This invention relates generally to the field of disc drive storage devices, and more particularly, but not by way of limitation, to adaptively controlling the rotational speed of discs of a disc drive during a servo track writing operation in order to minimize the excitation of mechanical resonances during the writing operation.

BACKGROUND OF THE INVENTION

Disc drives are commonly used in workstations, personal computers, laptops and other computer systems to store and retrieve vast amounts of user data. A typical disc drive comprises a plurality of magnetic discs that are rotated by a spindle motor at a constant high speed. The surface of each disc is divided into a series of data tracks which are spaced radially from one another across a band having an inner diameter and an outer diameter. The data tracks extend circumferentially around the discs and store data in the form of magnetic flux transitions within the radial extent of the tracks on the disc surfaces.

Each data track is divided into a number of data sectors that store fixed sized blocks of user data. Embedded among the sectors on each track are servo fields that enable the disc drive to control the position of heads used to transfer the user data between the discs and a host computer. More particularly, the heads are mounted to a rotary actuator assembly which includes a coil of a voice coil motor, so that the position of the heads relative to the tracks can be maintained by the application of current to the coil by a closed loop digital servo system in response to the servo information read by the servo fields. For an example of a typical digital servo system, see U.S. Pat. No. 5,262,907 issued Nov. 16, 1993 to Duffy et al., assigned to the assignee of the present invention.

The servo fields are written to the discs during the manufacture of a disc drive using a highly precise servo track writer, which utilizes the heads of the disc drive to write the servo fields. As the servo fields are used to define the tracks, it is important to precisely control the position of the heads as the servo fields are written to the disc surfaces. Thus, a typical servo track writer comprises a positioning system which advances the position of the heads, a laser based position detector which detects the position of the heads and control circuitry which provides the servo information to be written to the servo fields on the discs.

In one common type of servo track writer, the positioning system includes a pusher pin assembly that engages the actuator assembly through an opening in the disc drive base deck, in which case the position detector detects the position of the heads by detecting the radial position of the pusher pin assembly. In another common type of servo track writer, the positioning system controls the position of the heads directly by applying current to the coil of the disc drive voice coil motor, in which case the position detector detects the position of the heads by observing the radial position of the actuator assembly. For reference, servo track writing methodologies are generally discussed in U.S. Pat. No. 5,164,863 issued Nov. 17, 1992 to Janz and U.S. Pat. No. 5,241,430 issued Aug. 31, 1993 to Janz, both of which are assigned to the assignee of the present invention.

As will be recognized, proper radial alignment of the servo fields is essential to facilitate reliable operation of the disc drive. For example, when errors are introduced in the placement of the servo fields, components at corresponding frequencies can appear in a position error signal (PES) generated by the servo system during subsequent operation of the drive. The PES is a measure of the relative position of a selected head with respect to an associated track and is used primarily during track following operations to maintain the head over the center of the track. Thus, such frequency components appearing in the PES for a selected track will result in the repeated adjustment of the position of the head by the servo system in an attempt to maintain the head over the center of the track during each revolution of the disc. When such frequencies are sufficiently severe, the correction required to account for these frequencies can require a significant amount of the total track misregistration budget, limiting the overall track density that can be achieved in a disc drive design.

It is well known that the excitation of system resonances of the servo track writer can result in oscillations at the heads, leading to errors in the placement of the servo fields and corresponding frequency components in the PES during subsequent disc drive operation. System resonances can be excited from, for example, vibrations generated by the operation of the disc drive spindle motor during rotation of the discs as the servo fields are written. Particularly, ball bearings of the spindle motor can generate characteristic frequencies of vibration which are typically a function of the rotational speed of the discs.

Attempts to minimize the effects of system resonances have included efforts to adjust the mechanical response characteristics of servo track writers and to select a rotational speed (in revolutions per minute, or RPM) for a population of nominally identical disc drives that tends to minimize the excitation of system resonances during the servo track writing operation. However, such efforts generally have been found to be increasingly deficient for successive generations of disc drives. That is, as disc drive track densities increase, greater demands are placed upon servo track writers to accurately locate the servo fields on the discs; thus, vibration levels that were acceptable for earlier generations become increasingly unacceptable for later generations of drives. Moreover, the complexity and accuracy of servo track writers has increased in order to accommodate the writing of higher track densities; however, certain of these newer models have been found to have characteristic resonances that are excited by so many different spindle bearing frequencies that it is difficult to specify an acceptable rotational speed for any given population of disc drives.

Accordingly, there is a need for an improved approach to reducing the system resonances in a disc drive servo track writer in order to reduce or eliminate the effects of frequency components in a PES generated from the servo fields during subsequent disc drive operation.

SUMMARY OF THE INVENTION

The present invention provides an apparatus and method for writing servo fields to a head disc assembly (HDA) comprising a head, a disc and a spindle motor, wherein the rotational speed of the disc is adaptively optimized to minimize the excitation of mechanical resonances as a result of, for example, the rotation of the spindle motor.

In accordance with the preferred embodiment, a servo track writing system is provided having a pusher block assembly which positions the head relative to the disc. A control circuit controls the positioning of the pusher block assembly, as well as the rotational speed of the spindle motor. An electromechanical transducer is operably connected to the pusher block assembly and provides a vibration signal to a personal computer (PC), the vibration signal indicative of the vibratory response of the system.

The PC first instructs the control circuit to rotate the disc at each of a predetermined number of rotational speeds (in revolutions per minute, or RPM), during which the PC acquires and characterizes the vibratory response of the transducer in terms of frequency and amplitude. Once each of the rotational speeds have in turn been selected, the PC next selects an optimal rotational speed for the disc and instructs the control circuit to use the optimal RPM as the servo fields are written. An optimal speed is thus selected for each HDA from a population of nominally identical HDAs in order to take into account nominal variations among the HDAs and to individually optimize the servo track writing process for each HDA.

In an alternative embodiment, the servo track writing system controls the position of the heads directly through the application of current to the coil of a voice coil motor of the disc drive and the transducer is directly coupled to the actuator assembly to provide the vibration signal.

These and various other features as well as advantages which characterize the present invention will be apparent from a reading of the following detailed description and a review of the associated drawings.

BRIEF DESCRIPTION OF THE DRAWINGS

FIG. 1 is a top plan view of a head disc assembly (HDA) particularly suited for use in the practice of the preferred embodiment of the present invention.

FIG. 2 provides a representation of a portion of a selected track of the HDA of FIG. 1, illustrating the relative placement of servo fields during the servo track writing operation of the preferred embodiment.

FIG. 3 is a functional block diagram of a servo track writer system constructed in accordance with the preferred embodiment of the present invention used to write the servo fields of FIG. 2 on the discs of the HDA of FIG. 1.

FIG. 5 is a graphical representation of a cascade plot for a population of vibratory response curves generated for a selected HDA (such as the HDA of FIG. 1) obtained from the operation of the routine of FIG. 4 in accordance with the preferred embodiment of the present invention.

DETAILED DESCRIPTION

Figure 4:
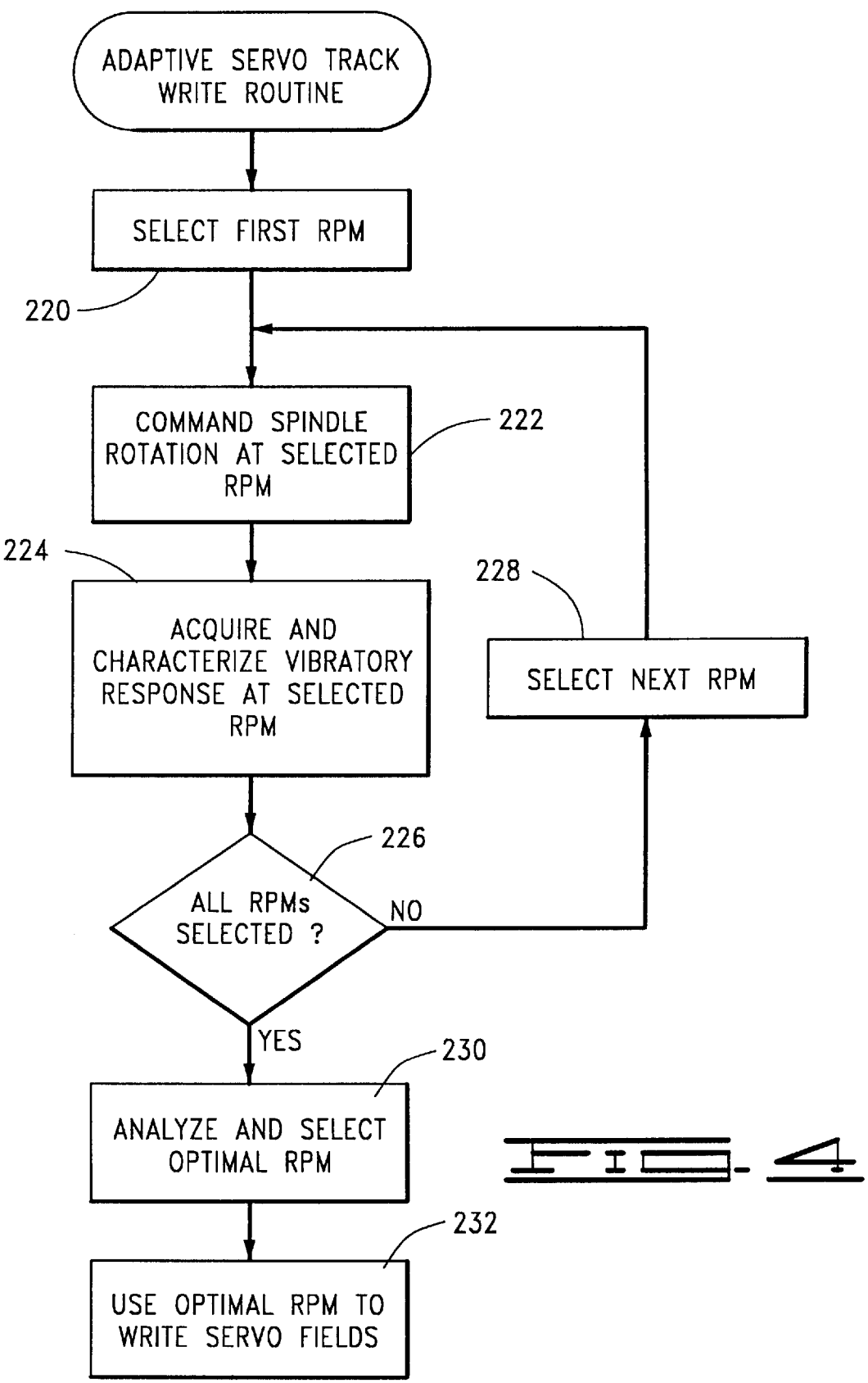
FIG. 4 provides a flow chart illustrating the general steps performed in the practice of the preferred embodiment of the present invention and is generally indicative of top level programming used by the personal computer (PC) of FIG. 3.

Turning now to the drawings and more particularly to FIG. 1, shown therein is a top plan view of a head disc assembly (HDA) 100 particularly suited for use in the practice of the preferred embodiment of the present invention. As will be recognized, the HDA 100 composes substantially all of the elements of a disc drive with the exception of a printed circuit board (PCB) which is typically attached to the bottom of the HDA 100 at a subsequent point during the manufacturing process.

The HDA 100 includes a base deck 102 to which various disc drive components are mounted and a top cover 104, which is shown in a partial cutaway fashion to expose selected components of interest. It will be readily understood that the base deck 102 includes an interior surface to which various disc drive components are mounted as well as side walls which, in combination with the top cover 104, provide sufficient height to house these components within a sealed internal environment.

Mounted to the base deck 102 is a spindle motor (shown generally at 106) to which a plurality of discs 108 are mounted for rotation at a constant high speed. Adjacent the discs 108 is an actuator assembly 110 which rotates about a cartridge bearing assembly 112. The actuator assembly 110 includes actuator arms 114 supporting gimbal assemblies 116 which in turn support a plurality of heads 118, with each of the heads 118 corresponding to each of the surfaces the discs 108. As provided hereinabove, the heads 118 are positionably located over data tracks (not shown) of the discs 108 in order to read data from and write data to the tracks, respectively. At such time that the HDA 100 is not in an operational mode, the heads 118 are typically moved to landing zones (denoted at broken line 120) near the inner diameter of the discs 108 and the actuator assembly 110 is latched using a latch pin 122 in conjunction with a conventional latching arrangement (not shown).

The actuator assembly 110 is controllably positioned by way of a voice coil motor (VCM) 124 which comprises an actuator coil 126 immersed in the magnetic field generated by one or more permanent magnets 128. It will be recognized that a magnetically permeable flux path (such as a second permanent magnet or pole piece) is mounted above the actuator coil 126 to complete the magnetic circuit of the VCM 124, but for purposes of clarity this flux path has not been shown in FIG. 1.

When current is passed through the actuator coil 126, an electromagnetic field is set up which interacts with the magnetic circuit of the VCM 124 to cause the actuator coil 124 to move in accordance with the well-known Lorentz relationship. As the actuator coil 124 moves, the actuator assembly 110 pivots about the cartridge bearing assembly 112, causing the heads 118 to move across the surfaces of the discs 108.

To provide the requisite electrical conduction paths between the heads 118 and disc drive read/write circuitry resident on the PCB (not shown), head wires (not separately shown) are routed on the actuator assembly 110 from the heads 118, along the gimbal assemblies 116 and the actuator arms 114, to a flex circuit assembly 130. In turn, the flex circuit assembly 130 is connected to a flex circuit bracket (shown generally at 132) in a conventional manner to facilitate communication between the flex circuit bracket 132 and the PCB once the PCB is mounted to the underside of the HDA 100.

Referring now to FIG. 2, shown therein is a generalized representation of a portion of a selected track 140 of the HDA 100, illustrating the relative placement of servo fields 142 during the servo track writing operation of the preferred embodiment. Data fields (sectors) used to store user data are subsequently formatted in the user data portion 144 disposed between each pair of adjacent servo fields 142. As will be recognized, the distance along the track 140 between adjacent servo fields 142 will vary depending upon the radius of the track 140.

A selected number of the servo fields 142 are commonly written to all of the tracks 140 on each disc 108, with the start of each corresponding servo field 142 on each surface of the discs being radially aligned. For reference, each servo field 142 includes automatic gain control and synchronization information to prepare the disc drive servo circuit for receipt of the rest of the information in the servo field 142, index information indicative of the angular displacement of the servo field with respect to the disc 108, track address information indicative of the radial position of the track 140 and position information used to control the position of the heads 118 with respect to the tracks 140. As will be recognized, the actual format of a given servo field will depend upon the requirements of a particular application.

Referring now to FIG. 3, shown therein is a functional block diagram of a servo track writer system 200 constructed in accordance with the preferred embodiment of the present invention. As discussed below, the servo track writer system 200 (hereinafter also referred to as the "system") writes the servo fields 142 to the discs 108 during the manufacturing of the HDA 100.

The HDA 100 is mounted over a mounting fixture 202 which serves as a mechanical reference for the system 200. The mounting fixture 202 comprises a granite block (not separately shown) having a calibrated, level top surface on which a mounting plate assembly (also not separately shown) is placed. The mounting plate assembly includes clamps which locate and secure the HDA 100 relative to the mounting fixture 202. As such mounting fixtures 202 are well known, additional discussion will not be provided herein except that the HDA 100 is mounted in such a manner so as to provide access to the actuator assembly 110 of the HDA 100 (FIG. 1) during a servo write operation.

Continuing with FIG. 3, a pusher block assembly 204 is mounted relative to the mounting fixture 202 underneath the HDA 100 so as to engage the actuator assembly 110 in order to selectively position the heads 118 relative to the surfaces of the discs 108 (FIG. 1). More particularly, an opening (not shown) is provided in the bottom of the base deck 102 of the HDA 100 so that the pusher block assembly 204 can access the internal environment of the HDA 100 by extending up through the opening in the base deck 102. Once the servo fields have been written, the opening is subsequently covered by an adhesive label or other means to seal the internal environment of the HDA 100. Further, it will be recognized that, as actuator assemblies (such as 110 in FIG. 1) typically include a mechanical bias toward the inner or the outer diameter of the discs 108, the pusher pin engages the actuator assembly 110 and exerts a force upon the actuator assembly 110 in a direction generally parallel to the discs 108 and in opposition to the bias. Thus, it is typically unnecessary to mechanically secure the pusher block assembly 204 to the actuator assembly 110.

The system 200 further comprises a conventional positioning system 206 which rotates the pusher block assembly 204 about a centrally defined axis (not shown) in order to advance the position of the actuator assembly 110. The position of the pusher block assembly 204 is controlled by the positioning system 206 through a detection circuit (not separately shown) which detects the position of the pusher block assembly 204 and provides correction signals to a motor (also not separately shown) of the positioning system 206 in order to rotate the pusher block assembly 204 accordingly. In the preferred embodiment, the positioning system 206 comprises a laser based, closed loop positioner utilizing a laser and appropriate sensors to detect the position of the pusher block assembly 204. One such laser based positioning system is model 137K15, manufactured by Teletrak Inc. of Santa Barbara, Calif.

With continued reference to FIG. 3, the system 200 is further shown to include a control circuit 208 which controls the operation of the positioning system 206 and hence, the positioning of the pusher block assembly 204 in response to commands provided by a personal computer (PC) 210. The control circuit 208 further controls the rotational speed of the spindle motor 106 of the HDA 100 and transfers the servo information to be written to the servo fields 142 to the heads 118 during the servo track writing operation.

Finally, FIG. 3 shows an accelerometer 212 mounted to the pusher block assembly 204, the accelerometer 212 comprising an electromechanical transducer that generates an output vibration signal indicative of the amplitude and frequency of mechanical vibrations established at the pusher pin of the pusher block assembly 204. The output signal from the accelerometer 212 is provided to a conventional data acquisition card (not separately shown) in the PC 210.

As provided above, the preferred embodiment of the present invention provides an apparatus and method for adaptively adjusting the rotational speed (RPM) of the spindle motor 106 for the servo track write operation associated with each HDA 100 in order to minimize the effects of system resonances and associated errors in the placement of the servo fields 142. FIG. 4 provides a flow chart illustrating the general steps performed in the practice of the preferred embodiment and is generally indicative of top level programming used by the PC 210.

After a user has mounted the HDA 100 to the mounting fixture 202 and initialized the PC 210, the routine of FIG. 4 first steps through the application of a series of rotational speeds (RPMs) for the spindle motor 106 in order to select an optimal RPM for the subsequent writing of the servo information. Beginning at block 220, the routine selects the first RPM from a predetermined population of RPMs (ranging from, for example 3500 RPM up to 7500 RPM).

Once the first RPM has been selected, the PC 210 instructs the control circuit 208 to initiate rotation of the spindle motor 106 of the HDA 100 at the selected RPM, as indicated by block 222. As will be recognized, the control circuit 208 emulates spindle motor control circuitry resident on the PCB that will subsequently be installed on the HDA 100 to complete the disc drive assembly; accordingly, the control circuitry 208 provides the necessary inputs to rotate the spindle motor 106 at the selected RPM. For a general discussion of typical spindle motor control circuits, see U.S. Pat. No. 5,631,999 issued May 20, 1997 to Dinsmore, assigned to the assignee of the present invention.

As indicated by block 224 of FIG. 4, the routine next characterizes the vibratory response of the system 200 at the selected RPM. More particularly, once the spindle motor 106 has attained rotation at the selected RPM, the PC 210 acquires the vibration signal generated by the accelerometer 212 in response to the mechanical vibration induced in the pusher block assembly 204 (FIG. 3). During the operation of block 224, the pusher pin is in physical contact with the actuator arms 114 of the HDA 100 so that system resonances excited by the rotation of the discs 108 at the selected RPM will be detected by the accelerometer 212. During the operation of block 224, the positioning system 206 can be instructed to advance the position of the pusher pin so as to sweep the heads 118 across the surfaces of the discs 108; alternatively, the pusher pin can position the heads 118 at a selected position with reference to the discs 108 if system resonances have been previously found to be particularly pronounced at this position. No servo data is written to the discs 108 at this time.

The effects of the selected RPM upon the excitation of system resonances at the pusher pin are transmitted to the PC 210, which characterizes the vibratory response using, for example, a fast Fourier transform in order to obtain both frequency and amplitude information over selected ranges of interest. Appropriate signal conditioning can also be applied to the vibratory signal received from the accelerometer 212, as required. Once the vibratory information has been acquired and characterized, the routine of FIG. 4 continues to decision block 226, which determines whether all of the RPMs from the predetermined population of RPMs have been selected; if not, the routine continues to block 228 wherein the next RPM is selected.

Accordingly, the routine of FIG. 4 continues until each of the RPMs from the population of RPMs has been selected and evaluated in turn, after which the flow passes from decision block 226 to block 230, wherein the optimal RPM is selected. The optimal RPM can be selected in a number of ways, including through the graphical display of the results of the various RPMs and selection by a user, or through automated selection techniques wherein the RPM having the optimal vibratory response is identified and selected using appropriate selection criteria (such as the RPM exhibiting the minimum response amplitude). Once the optimal RPM has been determined, as shown by block 232 the PC 210 instructs the control circuit 208 to use the optimal RPM in the subsequent writing of the servo fields 142 to the HDA, which is carried out in an otherwise conventional fashion at the optimal RPM.

Referring now to FIG. 5, shown therein is a graphical representation of a cascade plot of a population of vibratory response curves generated for a selected HDA (such as the HDA 100). The curves are plotted against an x-axis 240 indicative of frequency (in Hertz), a first y-axis 242 indicative of relative signal amplitude and a coextensive second y-axis 244 indicative of various RPMs selected from a population of RPMs in accordance with the routine of FIG. 4.

As shown in FIG. 5, a plurality of system resonance trends induced by bearing excitations are indicated generally at 246, 248, 250, 252, 254 and 256, all of which appear within a frequency range of from about 750 to 1000 Hertz. From a review of FIG. 5, an overall optimal RPM that minimizes the amplitude of the vibratory response of the system 200 would be around 5200 RPM. However, it will be recognized that, depending upon the construction of a typical disc drive, the gain characteristics of the disc drive servo circuit may be equipped to accommodate spurious error components in the PES at some frequencies better than at other frequencies; accordingly, such characteristics should be taken into account when selecting the optimal RPM. Further, for any two selected RPMs having otherwise similar effects on the excitation of system resonances, it is generally preferable to select the higher RPM in order to minimize the time required to perform the servo track writing operation, which is especially beneficial in a high volume manufacturing environment.

It will be recognized that the preferred embodiment discussed above utilizes the pusher block assembly 204 to advance the position of the heads 118. However, other servo track writer configurations can be readily employed in the practice of the present invention, such as in an alternative preferred embodiment wherein the heads are positioned through the application of current to the coil 126 of the VCM 124. The radial position of the actuator assembly 110 is directly observed by the positioning system of the servo track writer. In such a case, leads from the transducer (such as the accelerometer 212 of FIG. 3) can be directly attached to the actuator assembly 110 in order to obtain the vibration signals indicative of the system vibratory response.

In accordance with the foregoing discussion it will be recognized that the present invention is directed to an apparatus and method for writing servo information in servo fields (such as 142) in a head disc assembly (such as 100) comprising a head (such as 118), a disc (such as 108) and a spindle motor (such as 106) for rotating the disc.

A positioning system is provided to control the position of the head relative to the disc (the positioning system can comprise, for example, the pusher block assembly 204 shown in FIG. 3 or alternative circuitry that positions the heads directly through the application of current to the coil 126 of the HDA). Control circuitry (such as 206, 208) controls the positioning of the positioning system, the rotational speed of the spindle motor and the transfer of the servo information to be written to the disc.

An electromechanical transducer (such as 212) is operably coupled to the head so as to output a signal indicative of vibratory response of the head as the disc is rotated and a computer (such as 210) is provided which instructs the control circuit to rotate the spindle motor at each of a plurality of rotational speeds while characterizing the vibratory response of the HDA using the signal from the transducer for each of the rotational speeds. An optimal rotational speed is thereafter selected and used to write the servo information.

For the purposes of the appended claims, the terms "circuit" and "circuitry" will be broadly understood to cover both hardware and software implementations. The term "transducer" will be interpreted in accordance with the foregoing discussion and will include accelerometers (such as disclosed at 212), piezoelectric elements, and the like. The term "signal" will be understood to cover analog as well as digital expressions. The term "computer" will be understood to include a personal computer (such as disclosed at 210) as well as other, similar types of programmable, computational or logical units.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A system for writing servo fields to a disc of a head disc assembly, the head disc assembly having a head and a spindle motor for rotating the disc, the system comprising:

(a) a control circuit, operably connected to the spindle motor, which controls the rotational speed of the spindle motor;

(b) an electro-mechanical transducer, operably connected to the head which outputs a signal indicative of vibratory response of the head prior to writing servo data to the disc; and (c) a computer, operably connected to the control circuit and the transducer, which:

(i) instructs the control circuit to rotate the spindle motor at each of a plurality of rotational speeds while characterizing the vibratory response at each of the rotational speeds;

(ii) identifies an optimal rotational speed therefrom for the writing of the servo fields; and (iii) controls the head disc assembly to write the servo fields at the optimal rotational speed.

2. The system of claim 1, further comprising:

(d) a positioning system operably coupled with the control circuit which positions the head relative to the disc.

3. The system of claim 2, wherein the positioning system comprises a pusher block assembly, operably connected to the head, which advances the position of the head relative to the disc.

4. The system of claim 3, wherein the transducer is operably connected to the head by way of the pusher block assembly, so that the vibratory response of the head is determined by corresponding vibratory response of the pusher block assembly.

5. The system of claim 2, wherein the positioning system positions the head relative to the disc through the application of current to a coil of a voice coil motor of the head disc assembly.

6. The system of claim 1, wherein the transducer comprises an accelerometer.

7. The system of claim 1, wherein the computer performs a fast Fourier transform on the signal output by the transducer to obtain frequency and amplitude response information.

8. The system of claim 1, wherein step (c)(ii) comprises identifying a plurality of rotational speeds at which the vibratory response of the head is below an acceptance threshold, and selecting the optimal rotational speed as the largest rotational speed of the plurality of rotational speeds.

9. A method for adaptively optimizing the writing of servo information to a disc of a head disc assembly, characterized by, for each head disc assembly from a population of nominally identical head disc assemblies, performing steps of:

(a) rotating the disc at a first rotational speed and characterizing the effects of mechanical resonances excited by the rotation of the discs at the first rotational speed before writing the servo information;

(b) rotating the disc at a second rotational speed and characterizing the effects of mechanical resonances excited by the rotation of the discs at the second rotational speed before writing the servo information;

(c) selecting an optimal rotational speed that minimizes the effects of the mechanical resonances from the characterized effects at the first and second rotational speeds, and (d) using the optimal rotational speed to write the servo information to the disc.

10. The method of claim 9, wherein steps (a) and (b) are further characterized by operably connecting an electromagnetic transducer to the head disc assembly, the electromagnetic transducer providing output signals indicative of the vibratory responses of the head disc assembly as the disc is rotated at the first and second rotational speeds.

11. The method of claim 10, further characterized by the use of a fast Fourier transform upon the output signals to determine frequency and amplitude characteristics of the vibratory response of the head disc assembly.

12. The method of claim 9, wherein the optimal rotational speed is the greater of the first and second rotational speeds when the characterized effects of the first and second rotational speeds are within an acceptance threshold.

* * * * *